United States Patent [19]

Rowland

[11] Patent Number: 4,457,686

[45] Date of Patent: Jul. 3, 1984

[54] PELLET EXTRUSION DIE

[75] Inventor: Thomas J. Rowland, Sydney, Australia

[73] Assignee: Ingersol-Rand Company, Woodcliff Lake, N.J.

[21] Appl. No.: 477,260

[22] Filed: Mar. 21, 1983

[51] Int. Cl.[3] .................... B29F 3/04

[52] U.S. Cl. .................... 425/463; 425/331; 425/382 R; 425/467

[58] Field of Search .................... 425/463, 464, 382 R, 425/467, 67, 331, 311, 313

[56] References Cited

U.S. PATENT DOCUMENTS

| | | | |
|---|---|---|---|
| 2,059,486 | 11/1936 | Payne et al. | 425/331 |
| 2,073,271 | 3/1937 | Webb | 425/464 |
| 2,902,715 | 9/1959 | Norman | 425/331 |
| 2,963,740 | 12/1960 | Yim, Jr. | 425/463 |
| 3,199,465 | 8/1965 | Cunningham | 425/331 |
| 3,391,657 | 7/1968 | Reese | 425/464 |
| 4,327,050 | 4/1982 | Salmon | 425/311 |
| 4,380,424 | 4/1983 | Skoch et al. | 425/382 R |

FOREIGN PATENT DOCUMENTS

| | | | |
|---|---|---|---|
| 974045 | 11/1964 | United Kingdom | 425/331 |

*Primary Examiner*—Jeffery R. Thurlow
*Attorney, Agent, or Firm*—Walter C. Vliet

[57] ABSTRACT

An extrusion die wherein extrusion passageways are provided with a working section having a smooth wall, and a controlled relief section having a rippled wall of similar effective diameter as the working section in order to control pellet expansion and other factors.

10 Claims, 3 Drawing Figures

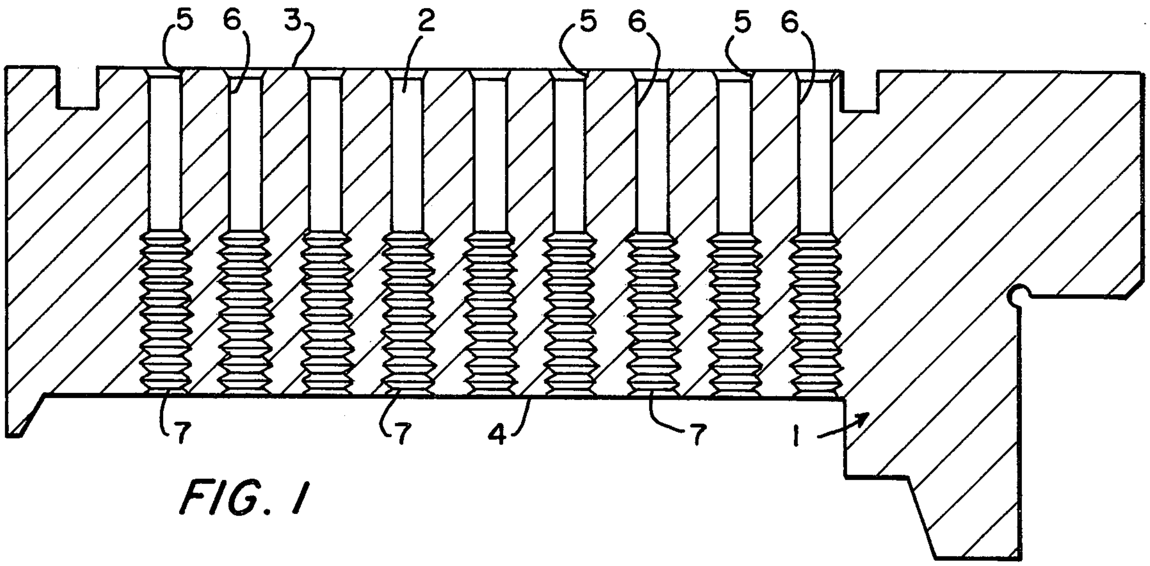
FIG. 1
FIG. 2
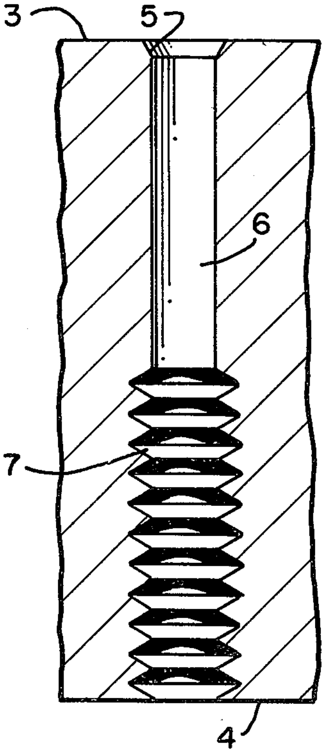
FIG. 3
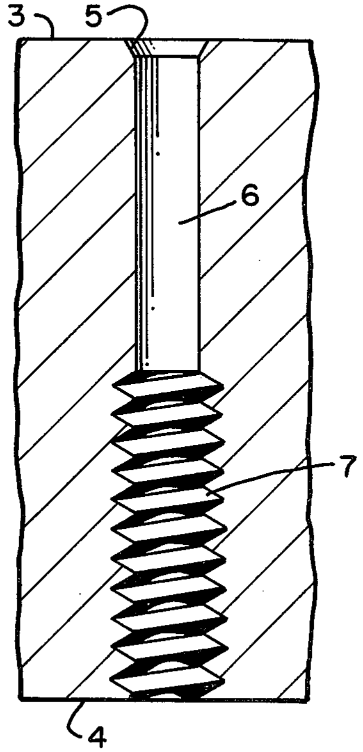

PELLET EXTRUSION DIE

BACKGROUND OF THE INVENTION

This invention relates to the extrusion of moldable material into pellets or cubes, and more particularly to an extrusion die for use in such connection. The effective length and diameter of a die hole is a carefully selected balance between capacity and pellet quality and wear and strength of the die. A short effective length usually increases capacity and lowers power consumption, whereas a thicker die promotes solid pellet formation at the expense of power and capacity. A larger effective diameter generally promotes capacity at the expense of pellet quality.

It is an object of this invention to produce a die which improves the quality of the pellet without decreasing capacity. It is also an object to provide a stronger die without substantial cost increase.

It is a further object of this invention to provide a pellet die hole which has a smooth inlet portion wherein the pellet is formed, and a ridged or rippled outlet portion wherein the diameter of the formed pellet is retained under controlled conditions which reduce friction and minimize heat transfer from the pellet.

These and other objects are obtained in a pellet mill die construction comprising a die member having a multiplicity of die holes constituting extrusion passages extending between the inner and outer faces thereof, each of the die holes comprising a bore hole having a smooth internal bore extending from the inner face at least part way through the die hole, and a ridged internal bore of equal effective diameter extending from the smooth bore towards the outer face.

BRIEF DESCRIPTION OF THE DRAWINGS

FIG. 1 shows the cross-section of a typical pellet mill die, having die holes therethrough, according to the present invention.

FIG. 2 is a cross-section of a single die hole to better illustrate the construction thereof.

FIG. 3 is a cross-section of a single die hole showing the details of an alternate embodiment construction.

DESCRIPTION OF THE PREFERRED EMBODIMENT

Referring to FIG. 1, the cross-section of a typical pellet mill die is shown and designated by the reference numeral 1. The die has a plurality of die holes 2 which perforate the die from an inner surface 3 to an outer surface 4.

Each die hole is comprised of: an inlet countersink 5, a working section 6, and a controlled relief section 7. Details of each of these sections are shown in FIGS. 2 and 3.

In a typical pellet mill, compression rollers would roll across the inner surface of the die 3 compressing the material to be pelletized through the inlet of each of the die holes. The countersink 5 is provided to facilitate entry of the material and to prevent high stress corners in this heavily loaded area.

The compaction and diameter of the pellet is controlled in the working section 6. This is normally a polished section and the die is formed by a combination of friction and heat generated in the walls of the working section.

In conventional dies, once the formed pellet exited the working section, it was subjected to uncontrolled expansion which often resulted in decreased pellet quality. To accomplish a required length of working section without reducing die thickness which is required to resist the high compaction forces, it became customary in many instances to provide a counter bore relief section. The relief section, however, was ineffectual in controlling the forces of expansion generated in the pellet.

In the present invention, a relief section is provided which has an effective diameter close to that of the working section, but because of its ribbed construction, friction is greatly reduced between the pellet and the relief section wall. In addition, material filling the valleys of the ribbed section acts as an insulator to control heat and moisture loss, thus further promoting a durable pellet. The valleys may also be intentionally filled with an antifriction material such as nylon, teflon or a solid lubricant such as graphite.

FIG. 2 shows a ribbed portion wherein the ribs are concentrically stacked. FIG. 3 shows a threaded ribbed portion. The threads may be any conventional type, such as a square thread or a conventional SAE or Whitworth thread. The ribbed construction may also be formed by an array of small dimples formed in the side wall of the relief section.

In particularly preferred embodiments, the length of the working section is from ¼" to 2" and the length of the relief section is from ¼" to 1½".

Table 1 shows comparative results for a standard die and a die according to this invention. The dies were used to pellet hay in a Century 929-25 pellet mill. In each die the die thickness was 2½" and the holes 5/16" diameter. In the die used in samples 2 and 3, the holes were tapped with a ⅜" Whitworth thread for ½" depth from the outer face of the die. In sample 5 the thread was tapped in a depth of 1".

TABLE 1

| Sample | Amps | Temp In | Temp Out | Durability % | Density Lbs/cu ft | Pellet Moisture % | Capacity | A % | B % |
|---|---|---|---|---|---|---|---|---|---|
| 1 | 107 | 60° C. | 70° C. | 59.1 | 27.85 | 11.4 | 4.89 | 11.98 | 40.9 |
| 2 | 107 | 70° C. | 80° C. | 88.88 | 30.89 | 9.7 | | 1.57 | 11.2 |
| 3 | 107 | 70° C. | 80° C. | 88.62 | 31.08 | 12.2 | | 6.05 | 11.38 |
| 4 | 90 | 70° C. | 76° C. | 80.11 | 29.99 | 14.5 | 4.176 | 9.36 | 19.89 |
| 5 | 130 | 65° C. | 93° C. | 94.82 | 36.36 | 11.0 | 4.176 | 1.51 | 5.18 |

SAMPLE 1 Local Hay - STD alloy die - Century 929-25 - 5/16" × 2½" NR
SAMPLE 2 Williams Hay - Alloy die according to this invention - Century 929-25 - 5/16" × 2½" × ½" RR
SAMPLE 3 Williams Hay - Alloy die according to this invention - Century 929-25 - 5/16" × 2½" × ½" RR
SAMPLE 4 Hay - STD alloy die - Century 929-25 - 5/16" × 2½" NR
SAMPLE 5 Hay - Alloy die according to this invention - Century 929-25 - 5/16" × 2½" × 1" RR
A = Percentage of sieved fines prior to durability test (8 mm aperture screen)
B = Percentage of sieved fines after durability test (8 mm aperature screen)

Other forms of ribbed relief construction will occur to one skilled in the art and we do not wish to be limited in the scope of our invention except as claimed.

We claim:

1. A pellet mill die construction for pelletizing solid material comprising:

a die member having a multiplicity of die holes constituting extrusion passages extending between the inner and outer faces thereof, each of said die holes comprising a bore hole having a smooth internal bore extending from said inner face at least part way through said die hole and a multiple ridged internal bore having an equal effective internal diameter approximating the diameter of said smooth bore extending from and in axial alignment with said smooth bore towards said outer face.

2. A pellet mill die construction according to claim 1 wherein said ridged internal bore is formed of a series of stacked circular concentric ridges.

3. A pellet mill die construction according to claim 1 wherein said ridged internal bore is formed as an internal thread having a minor diameter equal to the diameter of said smoother internal bore.

4. A pellet mill die construction according to claim 3 wherein said ridged internal bore is a standard screw thread.

5. A pellet mill die construction according to claim 3 wherein said ridged internal bore is a square thread.

6. A pellet mill die construction according to claim 1 wherein said ridged internal bore has an internal effective diameter equal to the diameter of said smooth internal bore.

7. A pellet mill die construction according to claim 1 wherein material passing through said die is trapped in said ridged internal bore in the area formed between the effective minor diameter and the major diameter of the ridged internal bore.

8. A pellet mill die construction according to claim 6 wherein said ridged internal bore has the ridged valleys filed with an antifriction material.

9. A pellet mill die construction according to claim 8 wherein the length of the working section is from $\frac{1}{4}''$ to 2" and the length of the relief section is from $\frac{1}{4}''$ to $1\frac{1}{2}''$.

10. An extruder die for solid fibrous material comprising:

a die member having a multiplicity of die holes constituting extrusion passages extending between the inner and outer faces thereof, each of said die holes comprising a bore hole having a smooth internal bore extending from said inner face at least part way through said die hole and a multiple ridged internal bore having an equal effective internal diameter approximating the diameter of said smooth bore extending from and in axial alignment with said smooth bore towards said outer face.

* * * * *